United States Patent
Nakashima et al.

(10) Patent No.: US 12,509,600 B2
(45) Date of Patent: Dec. 30, 2025

(54) PHOTOCURABLE INKJET PRINTING INK COMPOSITION

(71) Applicant: SAKATA INX CORPORATION, Osaka (JP)

(72) Inventors: Okinori Nakashima, Osaka (JP); Ryoichi Nitta, Osaka (JP); Koki Ogasahara, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 463 days.

(21) Appl. No.: 18/001,851

(22) PCT Filed: Jun. 4, 2021

(86) PCT No.: PCT/JP2021/021295
§ 371 (c)(1),
(2) Date: Dec. 14, 2022

(87) PCT Pub. No.: WO2021/261208
PCT Pub. Date: Dec. 30, 2021

(65) Prior Publication Data
US 2023/0312953 A1 Oct. 5, 2023

(30) Foreign Application Priority Data

Jun. 24, 2020 (JP) .................. 2020-109163
Jan. 29, 2021 (JP) .................. 2021-013631

(51) Int. Cl.
C09D 11/101 (2014.01)
C09D 11/106 (2014.01)
C09D 11/38 (2014.01)
B41J 2/01 (2006.01)

(52) U.S. Cl.
CPC .......... *C09D 11/106* (2013.01); *C09D 11/101* (2013.01); *C09D 11/38* (2013.01); *B41J 2/01* (2013.01)

(58) Field of Classification Search
None
See application file for complete search history.

(56) References Cited

U.S. PATENT DOCUMENTS

| | | |
|---|---|---|
| 2012/0270018 A1 | 10/2012 | Mizutani et al. |
| 2018/0371276 A1* | 12/2018 | Miyano .............. C09D 11/033 |
| 2019/0062580 A1 | 2/2019 | Nakashima et al. |
| 2022/0073767 A1* | 3/2022 | Harries .............. C09D 11/107 |
| 2023/0279249 A1 | 9/2023 | Nakashima et al. |
| 2023/0383134 A1 | 11/2023 | Aoki et al. |

FOREIGN PATENT DOCUMENTS

| | | |
|---|---|---|
| EP | 3095614 A1 | 11/2016 |
| GB | 2561985 A | 10/2018 |
| JP | 2012201815 A | 10/2012 |
| JP | 2015030796 A | 2/2015 |
| JP | 2017149825 A | 8/2017 |
| JP | 2019031618 A | 2/2019 |
| JP | 2019137735 A | 8/2019 |
| JP | 2019151714 A | 9/2019 |
| JP | 2019183018 A | 10/2019 |
| WO | 2010143738 A1 | 12/2010 |
| WO | 2020148441 A1 | 7/2020 |
| WO | 2022030261 A1 | 2/2022 |
| WO | 2022085246 A1 | 4/2022 |

OTHER PUBLICATIONS

International Search Report (ISR) mailed Jul. 27, 2021, issued for International application No. PCT/JP2021/021295. (3 pages).
Extended European Search Report (EESR) dated Jun. 17, 2024, issued for European counterpart patent application No. EP21828095.6 (6 pages).
International Preliminary Report on Patentability, dated Dec. 13, 2022, for corresponding international application PCT/JP2021/021295 (1 page).
Notification Concerning Transmittal of International Preliminary Report on Patentability, mailed Jan. 5, 2023, for corresponding international application PCT/JP2021/021295 (1 page).
Notification of Transmittal of Translation of the International Preliminary Report on Patentability, mailed Jan. 5, 2023, for corresponding international application PCT/JP2021/021295 (1 page).
Written Opinion of the International Searching Authority, mailed Jul. 27, 2021, for corresponding international application PCT/JP2021/021295 (4 pages).

* cited by examiner

*Primary Examiner* — Robert S Loewe
(74) *Attorney, Agent, or Firm* — Law Office of Katsuhiro Arai

(57) ABSTRACT

A photocurable inkjet printing ink composition satisfies requirements A to F: A: the total content of compounds selected from vinyl methyl oxazolidinone, N,N-dimethylacrylamide, benzyl acrylate, and N-vinylcaprolactam, is 30.0% by mass or higher; B: the total content of compounds selected from saturated hydrocarbon group-containing monofunctional monomers with 6 or more carbon atoms and saturated hydrocarbon group-containing polyfunctional monomers with 6 or more carbon atoms is 15.0% by mass or higher in the photocurable inkjet printing ink composition; C: the content of bis(2,4,6-trimethylbenzoyl)phenylphosphine oxide is 3.5% by mass or higher; D: the total content of ethoxy (2,4,6-trimethylbenzoyl)phenylphosphine oxide and bis(2,4,6-trimethylbenzoyl)phenylphosphine oxide is 6.0 to 12.0% by mass, and their ratio is 0.3 to 1.5; E: the content of amine-modified oligomer is 0.5 to 15.0% by mass in the photocurable inkjet printing ink composition; and F: a colorant is included.

3 Claims, No Drawings

PHOTOCURABLE INKJET PRINTING INK COMPOSITION

CROSS-REFERENCE TO RELATED APPLICATIONS

This application is the U.S. National Phase under 35 U.S.C. § 371 of International Application PCT/JP2021/021295, filed Jun. 4, 2021, which claims priority to Japanese Patent Application No. JP2020-109163, filed Jun. 24, 2020, and No. JP 2021-013631, filed Jan. 29, 2021. The International Application was published under PCT Article 21 (2) in a language other than English.

TECHNICAL FIELD

The present invention relates to a photocurable inkjet printing ink composition suitable for printing on sheets, etc., whose printing face is constituted by a paper or resin such as vinyl chloride-based polymer and ethylene-vinyl acetate-based copolymer, as well as a printed matter obtained by using the same.

BACKGROUND ART

As described in Patent Literature 1, a photocurable inkjet ink composition containing 8 parts by mass of TPO-L and 1 part by mass of Irgacure 819 (herein also referred to as Omnirad 819 which is the new commercial name), along with tricyclodecanedimethanol diacrylate, is public knowledge.

As described in Patent Literature 2, a photocurable inkjet ink composition containing 6 parts by mass of TPO-L and 1 part by mass of Irgacure 819, along with N-vinylcaprolactam, isobornyl acrylate, and isodecyl acrylate, is public knowledge.

As described in Patent Literature 3, an inkjet ink composition containing 2 parts by mass of TPO-L and 6 parts by mass of Irgacure 819, along with N-vinylcaprolactam and isobornyl acrylate, as well as a photocurable inkjet ink composition containing 4 parts by mass of TPO-L and 2 parts by mass of Irgacure 819, along with polymerizable compounds, are public knowledge.

As described in Patent Literature 4, a photocurable inkjet ink composition containing 4.1 to 13.5 parts by mass of TPO-L and 1.4 to 6.4 parts by mass of Irgacure 819, along with N-vinylcaprolactam and isobornyl acrylate, is public knowledge.

One unique aspect of the inkjet method is that it accommodates a wide range of materials that can be utilized as base materials for printing, allowing printing on sheets of paper, polymer, metal, and other hard/soft materials with ease. Particularly for billboard ads that are installed outdoors, performance requirements include being lightweight, exceptionally strong and durable, rain-resistant, and inexpensive; therefore, the ability to print on polymer sheets having these properties is a great advantage.

Additionally, in recent years, super-wide format inkjet printers have been introduced on the market that have a printing width of 2,000 mm or more, so as to allow, e.g., printing a large printed matter all at once that has been conventionally made by combining printed matters together by lamination, thereby making manufacturing of billboards easier and easier.

In general, tarpaulin is a frequent choice as a polymer sheet used for billboard ads. It should be noted that tarpaulin is a composite sheet comprising polyester or polyamide as a core material, with a polyvinyl chloride, ethylene-vinyl acetate-based copolymer or other vinyl-based polymer layered on the top and bottom thereof.

However, while photocurable inkjet ink compositions containing TPO-L and Irgacure 819 are known, as shown in Patent Literatures 1 to 4, inks are yet to be achieved that offer excellent curability, tackiness, adhesion, abrasion resistance, water resistance, ethanol resistance, and banding resistance when printed on various types of resin base materials. Furthermore, an art of considering the solubility of a photopolymerization initiator in a photocurable inkjet ink composition when considering the compositional makeup of the entire composition, is not known.

BACKGROUND ART LITERATURE

Patent Literature

Patent Literature 1: Japanese Patent Laid-open No. 2019-137735
Patent Literature 2: Japanese Patent Laid-open No. 2019-151714
Patent Literature 3: Japanese Patent Laid-open No. 2015-030796
Patent Literature 4: Japanese Patent Laid-open No. 2012-201815

SUMMARY OF THE INVENTION

Problems to be Solved by the Invention

An object of the present invention is to provide a photocurable inkjet printing ink composition that, subject to having a viscosity suitable for discharge, offers excellent curability, tackiness (no tackiness) after curing, adhesion to various types of resin base materials, abrasion resistance, water resistance, ethanol resistance, and banding resistance.

Means for Solving the Problems

After studying in earnest to achieve the aforementioned object, the inventors of the present invention found that a specific compositional makeup would achieve the aforementioned object, and completed the present invention.

To be specific, the present invention is described below.
1. A photocurable inkjet printing ink composition satisfying all of requirements A to F below:
   A: the total content of one or more types of compounds selected from vinyl methyl oxazolidinone, N,N-dimethylacrylamide, benzyl acrylate, and N-vinylcaprolactam is 30.0% by mass or higher in the photocurable inkjet printing ink composition;
   B: the total content of one or more types of compounds selected from saturated hydrocarbon group-containing monofunctional monomers with 6 or more carbon atoms and saturated hydrocarbon group-containing polyfunctional monomers with 6 or more carbon atoms is 15.0% by mass or higher in the photocurable inkjet printing ink composition;
   C: the content of bis(2,4,6-trimethylbenzoyl)phenylphosphine oxide is 3.5% by mass or higher in the photocurable inkjet printing ink composition;
   D: the total content of ethoxy (2,4,6-trimethylbenzoyl) phenylphosphine oxide and bis(2,4,6-trimethylbenzoyl)phenylphosphine oxide is 6.0 to 12.0% by mass in the photocurable inkjet printing ink composition, and their ratio by mass, or ethoxy (2,4,6-trimethylbenzoyl)

phenylphosphine oxide/bis(2,4,6-trimethylbenzoyl) phenylphosphine oxide, is 0.3 to 1.5;

E: the content of amine-modified oligomer is 0.5 to 15.0% by mass in the photocurable inkjet printing ink composition; and F: a colorant is included.

2. The photocurable inkjet printing ink composition according to 1, wherein, as the compound(s) specified in requirement A, containing benzyl acrylate is contained by 16.0% by mass or more.

3. The photocurable inkjet printing ink composition according to 1 or 2, satisfying requirement G below:

G: a pigment dispersant having tertiary amino groups or nitrogen-containing heterocyclic structure is contained.

Effects of the Invention

The photocurable inkjet printing ink composition proposed by the present invention contains a colorant and can demonstrate the effects of having low viscosity, excellent photopolymerization initiator solubility, and no tack on the cured coated film surface, being excellent in adhesion to various types of base materials, abrasion resistance, water resistance, and ethanol resistance, and also preventing banding of coating film.

MODE FOR CARRYING OUT THE INVENTION

The photocurable inkjet printing ink composition proposed by the present invention, which satisfies requirements A to F above, is explained below in order.

<Requirement A>

Requirement A states that the total content of one or more types of compounds selected from vinyl methyl oxazolidinone (5-methyl-3-vinyloxazolidin-2-one) (hereinafter also denoted as "VMOX"), N,N-dimethylacrylamide, benzyl acrylate, and N-vinylcaprolactam (hereinafter also denoted as "VCAP") is 30.0% by mass or higher in the photocurable inkjet printing ink composition. If the content is lower than 30.0% by mass, dissolving the photopolymerization initiators in the photocurable inkjet printing ink composition becomes difficult and it can no longer function as an ink composition as a result.

These compounds are liquid with relatively low viscosity at normal temperature and exhibit excellent inkjet printability. Additionally, other components in the photocurable inkjet printing ink composition may be dissolved or dispersed therein. They also have a property of excellent solubility with respect to the photopolymerization initiators described below. Furthermore, their excellent human safety profile makes these compounds easy to handle, and the cured coating film will have low odor, high curability, and high water resistance.

The total content of one or more compounds selected therefrom is preferably 32.0% by mass or higher, or more preferably 34.0% by mass or higher, in the photocurable inkjet printing ink composition. Meanwhile, it is preferably 50.0% by mass or lower, or more preferably 40.0% by mass or lower, in the photocurable inkjet printing ink composition.

Furthermore, preferably benzyl acrylate is contained in the photocurable inkjet printing ink composition, in which case the content thereof in the photocurable inkjet printing ink composition is preferably 16.0% by mass or higher, or more preferably 18.0% by mass or higher, or yet more preferably 20.0% by mass or higher, or most preferably 25.0% by mass or higher. Meanwhile, it is preferably 50.0% by mass or lower, or more preferably 40.0% by mass or lower, or yet more preferably 35.0% by mass or lower, or most preferably 30.0% by mass or lower.

Preferably vinyl methyl oxazolidinone, N,N-dimethylacrylamide, and N-vinylcaprolactam are used together with benzyl acrylate, while it is also preferable that benzyl acrylate is contained along with one type of these compounds, or benzyl acrylate is contained along with vinyl methyl oxazolidinone and N,N-dimethylacrylamide.

Further, it is more preferable that the sum of one or more types selected from vinyl methyl oxazolidinone, N,N-dimethylacrylamide, and N-vinylcaprolactam is such that its content becomes lower than the content of benzyl acrylate.

<Requirement B>

Requirement B states that the total content of one or more types of compounds selected from saturated hydrocarbon group-containing monofunctional monomers with 6 or more carbon atoms and saturated hydrocarbon group-containing polyfunctional monomers with 6 or more carbon atoms is 15.0% by mass or higher in the photocurable inkjet printing ink composition. The saturated hydrocarbon groups may be alkyl groups, alkylene groups, or groups having a ring structure, with 6 or more carbon atoms.

Among these saturated hydrocarbon groups with 6 or more carbon atoms, those with 20 or fewer carbon atoms are preferred, while those with 15 or fewer carbon atoms are more preferred, and those with 12 or fewer carbon atoms are yet more preferred.

Preferably, in total, the saturated hydrocarbon group-containing monofunctional monomers with 6 or more carbon atoms and saturated hydrocarbon group-containing polyfunctional monomers with 6 or more carbon atoms account for 18.0% by mass or more in the photocurable inkjet printing ink composition. Meanwhile, they account for preferably 30.0% by mass or less, or more preferably 25.0% by mass or less, in the photocurable inkjet printing ink composition.

(Saturated Hydrocarbon Group-Containing Monofunctional Monomers with 6 or More Carbon Atoms)

For the saturated hydrocarbon group-containing monofunctional monomers with 6 or more carbon atoms, isooctyl (meth)acrylate, tridecyl (meth)acrylate, 2-ethylhexyl (meth)acrylate, lauryl (meth)acrylate, stearyl (meth)acrylate, 2-ethylhexylcarbitol (meth)acrylate, isoamyl (meth)acrylate, isodecyl (meth)acrylate, isotetradecyl (meth)acrylate, isobornyl (meth)acrylate, etc., may be used. Among these, isobornyl acrylate is preferred.

(Saturated Hydrocarbon Group-Containing Polyfunctional Monomers with 6 or More Carbon Atoms)

For the saturated hydrocarbon group-containing polyfunctional monomers with 6 or more carbon atoms, 1,9-nonanediol di(meth)acrylate, neopentyl glycol di(meth)acrylate, hexanediol di(meth)acrylate, etc., may be used. Among these, hexanediol diacrylate is preferred.

<Requirement C>

Requirement C states that the content of bis(2,4,6-trimethylbenzoyl)phenylphosphine oxide (Irgacure 819) is 3.5% by mass or higher in the photocurable inkjet printing ink composition. Also, it is preferably 4.0% by mass or higher, or more preferably 4.5% by mass or higher, or yet more preferably 5.0% by mass or higher. Meanwhile, it is preferably 8.5% by mass or lower, or more preferably 6.5% by mass or lower.

If the content of bis(2,4,6-trimethylbenzoyl)phenylphosphine oxide is lower than 3.5% by mass, the coating film will have poor surface curability, tackiness, and abrasion resistance.

<Requirement D>

Requirement D, which specifies a combination, in terms of content, of two types of photopolymerization initiators, states that the total content of ethoxy(2,4,6-trimethylbenzoyl)phenylphosphine oxide and bis(2,4,6-trimethylbenzoyl)phenylphosphine oxide is 6.0 to 12.0% by mass in the photocurable inkjet printing ink composition, and that their ratio by mass, or ethoxy (2,4,6-trimethylbenzoyl)phenylphosphine oxide/bis(2,4,6-trimethylbenzoyl)phenylphosphine oxide, is 0.3 to 1.5.

If the total content of ethoxy (2,4,6-trimethylbenzoyl)phenylphosphine oxide and bis(2,4,6-trimethylbenzoyl)phenylphosphine oxide is lower than 6.0% by mass in the photocurable inkjet printing ink composition, poor banding resistance, and in some cases poor surface curability, tackiness, adhesion, abrasion resistance, and water resistance, will result. If it exceeds 12.0% by mass, the solubility of photopolymerization initiators will worsen and poor banding resistance will result.

The total content of ethoxy (2,4,6-trimethylbenzoyl)phenylphosphine oxide and bis(2,4,6-trimethylbenzoyl)phenylphosphine oxide is preferably 6.5% by mass or higher, or more preferably 7.0% by mass or higher, or yet more preferably 7.5% by mass or higher, or most preferably 8.0% by mass or higher, in the photocurable inkjet printing ink composition. Meanwhile, it is preferably 11.0% by mass or lower, or more preferably 10.5% by mass or lower, or yet more preferably 10.0% by mass or lower, or most preferably 9.5% by mass or lower.

If their ratio by mass, or ethoxy (2,4,6-trimethylbenzoyl) phenylphosphine oxide/bis(2,4,6-trimethylbenzoyl)phenylphosphine oxide, is lower than 0.3, the coating film will become poor in surface curability, adhesion to some base materials, abrasion resistance, water resistance, and banding resistance, while a ratio by mass exceeding 1.5 can lead to poor tackiness, abrasion resistance, and banding resistance, as well as poor surface curability and water resistance.

Ethoxy (2,4,6-trimethylbenzoyl)phenylphosphine oxide/bis(2,4,6-trimethylbenzoyl)phenylphosphine oxide is preferably 0.40 or higher, or more preferably 0.50 or higher. Meanwhile, it is preferably 1.00 or lower, or more preferably 0.80 or lower.

<Requirement E>

Requirement E states that the content of amine-modified oligomer is 0.5 to 15.0% by mass in the photocurable inkjet printing ink composition.

The amine-modified oligomers include acrylated amine compounds such as CN371, CN373, CN383, and CN386 (manufactured by Sartomer, Inc), each being an acrylated amine compound having two photopolymerizable functional groups and two amino groups in the molecule.

If the content of amine-modified oligomer in the photocurable inkjet printing ink composition is lower than 0.5% by mass, poor surface curability, tackiness, and abrasion resistance will result, while a content exceeding 15.0% by mass can make the photocurable inkjet printing ink composition too viscous or cause the photocurable inkjet printing ink composition to have unbalanced physical properties.

The content of amino group-containing oligomer in the photocurable inkjet printing ink composition is preferably 1.0% by mass or higher, or more preferably 2.0% by mass or higher, or yet more preferably 3.0% by mass or higher, or most preferably 4.0% by mass or higher. Meanwhile, it is preferably 12.0% by mass or lower, or more preferably 10.0% by mass or lower, or yet more preferably 8.0% by mass or lower, or most preferably 7.0% by mass or lower.

<Other Photopolymerizable Monomers>

The photocurable inkjet printing ink composition proposed by the present invention may contain other monofunctional or polyfunctional photopolymerizable monomers besides the aforementioned monomers. It should be noted that such other photopolymerizable monomers may be used to the extent that the effects of the present invention are not impaired.

Among these photopolymerizable monomers, the monofunctional photopolymerizable monomers include benzyl (meth)acrylate, butyl (meth)acrylate, ethyl carbitol (meth)acrylate, 2-methoxyethyl (meth)acrylate, 2-methoxybutyl (meth)acrylate, 4-hydroxybutyl (meth)acrylate, diethylene glycol monoethyl ether (meth)acrylate, ethoxydiethylene glycol (meth)acrylate, caprolactone (meth)acrylate, methoxytripropylene glycol (meth)acrylate, phenoxyethyl (meth)acrylate, EO (ethylene oxide)-modified succinic acid (meth)acrylate, and other monofunctional (meth)acrylates.

Others include acryloylmorpholine, acrylonitrile, acrylamide, diethylacrylamide, styrene, (meth)acrylic acid, etc.

These monofunctional photopolymerizable monomers might not be contained, but if they are contained, they account for preferably 5.0% by mass or more, or more preferably 10.0% by mass or more, or yet more preferably 15.0% by mass or more, in the photocurable inkjet printing ink composition. Meanwhile, they account for preferably 40.0% by mass or less, or more preferably 30.0% by mass or less, or yet more preferably 28.0% by mass or less, in the photocurable inkjet printing ink composition.

For the polyfunctional photopolymerizable monomers, which are compounds having multiple carbon-carbon unsaturated bonds in the molecule, the following compounds may be adopted, for example:

Vinyloxyethoxyethyl (meth)acrylate, ethylene glycol di(meth)acrylate, propylene glycol di(meth)acrylate, butanediol di(meth)acrylate, dipropylene glycol di(meth)acrylate, triethylene glycol di(meth)acrylate, tripropylene glycol di(meth)acrylate, and other (poly)alkylene glycol di(meth)acrylates, dimethylol-tricyclodecane di(meth)acrylate, hydroxypivalic acid neopentyl glycol di(meth)acrylate, polytetramethylene glycol diacrylate, trimethylolpropane tri(meth)acrylate and ethylene oxide-modified products thereof, pentaerythritol tri(meth)acrylate, pentaerythritol tetra(meth)acrylate and ethylene oxide-modified products thereof, dipentaerythritol penta(meth)acrylate and ethylene oxide-modified products thereof, dipentaerythritol hexa(meth)acrylate and ethylene oxide-modified products thereof, urethane (meth)acrylate, epoxy (meth)acrylate, polyester (meth)acrylate, pentaerythritol ethoxy tetraacrylate, caprolactam-modified dipentaerythritol hexaacrylate, ethoxylated bisphenol A diacrylate, alkoxylated tetrahydrofurfuryl acrylate, etc.

These polyfunctional photopolymerizable compounds, or other photopolymerizable monomers, might not be contained, but if they are contained, their content is 1.0 to 10.0% by mass in the photocurable inkjet printing ink composition.

Acrylic-based resin might not be contained, but it may be contained to the extent that the effects of the present invention are not impaired, in the photocurable inkjet printing ink composition proposed by the present invention. Such acrylic-based resin may be a polymer comprising any (meth)acrylate soluble in organic solvents, copolymer of such polymers, etc. Such (meth)acrylate may be, for example, ethyl, propyl or butyl (meth)acrylate or other alkyl (meth)acrylate; hydroxymethyl, hydroxyethyl, hydroxypropyl, hydroxybutyl or hydroxypentyl (meth)acrylate or other hydroxyalkyl (meth)acrylate, etc.

Examples include BR-60 (Tg: 75° C.), BR-64 (Tg: 55° C.), BR-75 (Tg: 90° C.), BR-77 (Tg: 80° C.), BR-83 (Tg: 105° C.), BR-87 (Tg: 105° C.), BR-88 (Tg: 105° C.), BR-90 (Tg: 65° C.), BR-93 (Tg: 50° C.), BR-95 (Tg: 80° C.), BR-105 (Tg: 50° C.), BR-106 (Tg: 50° C.), BR-107 (Tg: 50° C.), BR-108 (Tg: 90° C.), BR-113 (Tg: 75° C.), BR-115 (Tg: 50° C.) and BR-116 (Tg: 50° C.) manufactured by Mitsubishi Chemical Corporation, and the like.

If acrylic-based resin is contained, the content of acrylic-based resin relative to the total amount of photocurable inkjet printing ink composition is preferably 1.0 to 5.0% by mass, or more preferably 1.5 to 4.0% by mass, or yet more preferably 2.0 to 3.0% by mass.

To the extent that the performance of the photocurable inkjet printing ink composition proposed by the present invention does not drop, resins other than the aforementioned acrylic-based resin, such as vinyl chloride-based resin, vinyl chloride-vinyl acetate-based resin, ethylene-vinyl acetate-based resin, styrene-acrylic-based resin, styrene-maleic acid-based resin, rosin-based resin, rosin ester-based resin, petroleum resin, coumarone indene-based resin, terpen phenol-based resin, phenol resin, ketone resin, urethane resin, melamine resin, urea resin, epoxy-based resin, cellulose-based resin, xylene resin, alkyd resin, aliphatic hydrocarbon resin, butyral resin, maleic acid resin, fumaric acid resin, etc., may also be combined.

<Requirement F>

For use as the colorant contained in the photocurable inkjet printing ink composition proposed by the present invention, preferably one is selected from known organic coloring pigments and inorganic coloring pigments traditionally used in photocurable inkjet printing ink compositions. It should be noted that the colorant is any of the coloring pigments below other than titanium oxide, or other coloring pigment except for white pigment.

Specific examples of organic coloring pigments include azo-based, azomethine-based, polyazo-based, phthalocyanine-based, quinacridone-based, anthraquinone-based, indigo-based, thioindigo-based, quinophthalone-based, benzimidazolone-based, isoindoline-based, isoindolinone-based, diketopyrolopyrrole-based, dioxazine-based, and other organic pigments, where specific examples as expressed by the color index include Pigment Black 7, Pigment Blue 15, 15:1, 15:3, 15:4, 15:6, 60, Pigment Green 7, 36, Pigment Red 9, 48, 49, 52, 53, 57, 97, 122, 149, 168, 177, 178, 179, 206, 207, 209, 242, 254, 255, Pigment Violet 19, 23, 29, 30, 37, 40, 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, Pigment Orange 36, 43, 51, 55, 59, 61, 71, 74, etc.

Preferably the content of organic coloring pigment in the ink composition proposed by the present invention is 1.0 to 10.0% by mass, according to the desired degree of development in color, in the photocurable inkjet printing ink composition.

(Carbon Black)

As an inorganic coloring pigment, any carbon black traditionally used in inkjet printing may be used; however, abrasion resistance and gloss performance of obtained colored images tend to improve as the average primary particle size of carbon black decreases, and therefore the carbon black should have an average primary particle size of preferably 15 to 40 nm, or more preferably 20 to 30 nm.

The average primary particle size of a carbon black refers to the value obtained as follows. First, a dispersion liquid constituted by chloroform in which the carbon black has been fully diluted and dispersed is prepared, where its concentration is such that, when images of carbon black agglomerates are micrographically captured with a transmission electron microscope (TEM), the images of agglomerates in the micrograph do not overlap one another. Next, it is spread on a collodion membrane mesh and dried, and then micrographically captured in this condition to obtain a TEM micrograph (magnification factor 30000× after enlarging). Then, the TEM micrograph is read with a scanner to digitize image signals that are then input to a computer to obtain the area of each agglomerate based on image analysis. Furthermore, the average area of a primary particle is obtained from the area of each agglomerate and the number of agglomerated primary particles, and the diameter of a circle having the same area is arithmetically considered the average particle size of a primary particle. Finally, the arithmetic average of the average particle sizes of primary particles representing all or a specific number of agglomerates is calculated as the average primary particle size.

Under the present invention, the content of carbon black, if any carbon black is contained, is 1.0 to 12.0% by mass, or preferably 2.0 to 6.0% by mass, relative to the total photocurable inkjet printing ink composition. If the content is lower than 1.0% by mass, the density of the obtained image becomes lower, while a content exceeding 12.0% by mass raises a concern that discharge stability of the inkjet ink composition may drop.

Also, the carbon black used has a specific surface area of preferably 80 to 150 $m^2/g$, or more preferably 100 to 130 $m^2/g$. Keeping it in this range is particularly preferable in terms of abrasion resistance, solid filling property, anti-mottling property, etc., of colored images.

Additionally, the carbon black used is preferably an acid carbon black, or more preferably one whose pH is 2.5 to 4.0.

The aforementioned specific surface area of carbon black indicates the specific surface area by nitrogen adsorption as measured in accordance with JIS K6217, while the pH indicates the pH value as measured in accordance with JIS K6221.

Such carbon black may be Mitsubishi Carbon Black MA7, MA77, MA8, MA11, MA100, or MA220, and the like.

(Other Inorganic Coloring Pigments)

Specific examples of other inorganic coloring pigments include titanium oxide, zinc flower, zinc oxide, lithopone, iron oxide, silicon dioxide, kaolinite, montmorillonite, talc, barium sulfate, calcium carbonate, silica, cadmium red, red iron oxide, molybdenum red, chrome vermillion, molybdate orange, lead yellow, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, mica, etc.

Any one type of these pigments may be used alone, or two or more types may be combined to the extent that the effects of the present invention are not impaired, where the amount used is 0.5 to 10.0% by mass, or more preferably 2.0 to 7.0% by mass, relative to the total amount of photocurable inkjet printing ink composition. If the amount of pigment used is less than 0.5% by mass, coloring strength tends to be insufficient, while an amount exceeding 10.0% by mass tends to cause viscosity to rise and ink fluidity to drop.

It should be noted that, while any white pigment, particularly titanium oxide, etc., may be used together with other coloring pigments, it is necessary that, if used, it will not impair the effects of the present invention. Also, titanium oxide or other white pigment need not be contained.

(Pigment Dispersant)

The pigment dispersants that may be contained in the photocurable inkjet printing ink composition proposed by the present invention include ionic or nonionic surfactants and anionic, cationic, or nonionic high-molecular compounds, for example.

In particular, those constituted by high-molecular compounds are preferred and, for example, the carbodiimide-based compounds described in Japanese Patent Laid-open No. 2004-083872, International Patent Laid-open No. WO2003/076527, and International Patent Laid-open No. WO2004/000950, AJISPER PB821 and 822 that are basic functional group-containing copolymers (manufactured by Ajinomoto Fine-Techno Co., Inc.) (acid value and amine value are both 10 to 20 mgKOH/g), SOLSPERSE 56000 (manufactured by The Lubrizol Corporation), SOLSPERSE 39000 (manufactured by The Lubrizol Corporation), DISPERBYK (manufactured by BYK-Chemie Japan K.K.), etc., are preferred. Any one type of these pigment dispersants may be used alone or two or more types may be combined, where the use amount is 5 to 80% by mass, or more preferably 10 to 60% by mass, relative to the pigment.

In particular, basic functional group-containing copolymers with an amine value of 10 to 40 mgKOH/g are preferred.

It should be noted that any of the aforementioned pigment dispersants may be selected and used as deemed appropriate according to the type of pigment and type of organic solvent used.

<Requirement G>

Among the aforementioned pigment dispersants, preferably a pigment dispersant having, in particular, tertiary amino groups or nitrogen-containing heterocyclic structure is contained.

For such pigment dispersant, use of SOLSPERSE 20000, SOLSPERSE 32000, BYK-LP N6918, BYK-LP N21116, DISPERBYK 161, DISPERBYK 164, DISPERBYK 167, DISPERBYK 2164, BYKJET 9150, BYKJET 9151, Efka PX4320, Efka PX4701, Efka PX4703, etc., is preferred.

(Organic Solvent)

The photocurable inkjet printing ink composition proposed by the present invention may be of a so-called nonsolvent type in which all liquid components undergo curing reaction to be solidified, or of a solvent type in which the printed coating film is dried to remove solvent and then cured. It should be noted that water is not used as a solvent.

The following describes a case where the photocurable inkjet printing ink composition proposed by the present invention contains an organic solvent.

The organic solvents that may be contained in the photocurable inkjet printing ink composition proposed by the present invention include propylene carbonate, diethylene glycol dialkyl ether, dipropylene glycol alkyl ether acetate, etc.

For the diethylene glycol dialkyl ether, preferably diethylene glycol ethyl methyl ether and/or diethylene glycol diethyl ether is/are used, or any other diethylene glycol dialkyl ether may also be combined.

For the dipropylene glycol alkyl ether acetate, preferably one containing an alkyl group with 6 or fewer carbon atoms, or more preferably one containing an alkyl group with 3 or fewer carbon atoms, or yet more preferably one containing an alkyl group with 2 or fewer carbon atoms, may be adopted.

Additionally, besides diethylene glycol dialkyl ether, an alkylene glycol derivative with a flash point of 50 to 150° C. may also be combined in order to adjust drying property and further improve the anti-mottling property.

Examples of such alkylene glycol derivatives with a flash point of 50 to 150° C. include, for example, triethylene glycol dimethyl ether, triethylene glycol diethyl ether, tetraethylene glycol dimethyl ether and other (poly)ethylene glycol dialkyl ethers, propylene glycol dimethyl ether, propylene glycol diethyl ether, dipropylene glycol dimethyl ether, dipropylene glycol diethyl ether, tetrapropylene glycol diethyl ether, tetrapropylene glycol dimethyl ether and other (poly)propylene glycol dialkyl ethers, propylene glycol monobutyl ether, dipropylene glycol monomethyl ether, dipropylene glycol monoethyl ether and other (poly)propylene glycol monoalkyl ethers, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate and other (poly)propylene glycol monoalkyl ether monoalkyl esters, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether and other (poly)ethylene glycol monoalkyl ethers, ethylene glycol monomethyl ether acetate, ethylene glycol monoethyl ether acetate, ethylene glycol monobutyl ether acetate, diethylene glycol monomethyl ether acetate, triethylene glycol monomethyl ether acetate and other (poly)ethylene glycol monoalkyl ether monoalkyl esters, ethylene glycol diacetate, diethylene glycol diacetate, triethylene glycol diacetate and other (poly)ethylene glycol diesters, diethylene glycol monoethyl ether acetate, diethylene glycol monobutyl ether acetate, diethylene glycol monopropyl ether acetate, triethylene glycol monoethyl ether acetate, triethylene glycol monobutyl ether acetate and other (poly)ethylene glycol monoether monoesters.

Among the alkylene glycol derivatives with a flash point of 50 to 150° C., diethylene glycol ethyl methyl ether and diethylene glycol diethyl ether are called to attention first.

Also, to the extent that it does not significantly change the flash point of the solvent as a whole, ethylene glycol diethyl ether, ethylene glycol dimethyl ether, propylene glycol monomethyl ether, propylene glycol monoethyl ether, propylene glycol monomethyl ether acetate, etc., whose flash point is not in a range of 50 to 150° C., may also be combined.

(Photopolymerization Initiators)

For the photopolymerization initiators used under the present invention, the two types used under requirements C and D are sufficient. To be specific, they are ethoxy (2,4,6-trimethylbenzoyl)phenylphosphine oxide (product name: TPOL, manufactured by Lambson Ltd.) and bis(2,4,6-trimethylbenzoyl)phenylphosphine oxide (product name: Omnirad 819, herein also referred to as Irgacure 819 which is the former commercial name, manufactured by BASF SE).

Also, (2,4,6-trimethylbenzoyl)diphenylphosphine oxide (product name: TPO, manufactured by Lambson Ltd.) must not be used in consideration of the case of handling during manufacturing and use of the photocurable inkjet printing ink composition.

(Sensitizer)

In the photocurable inkjet printing ink composition proposed by the present invention, a photosensitizer (compound) that has light absorbing properties primarily in the UV wavelength range of 400 nm and higher and manifests a function to sensitize the curing reaction under light having the wavelengths in this range, may also be used together with the photopolymerization initiators, to promote curability under UV light from a light-emitting diode (LED) light source.

Such sensitizer may be an anthracene-based sensitizer, thioxanthone-based sensitizer, etc., where a thioxanthone-based sensitizer is preferred. Any of these sensitizers may be used alone or two or more types may be used together.

Specific examples include 9,10-dibutoxyanthracene, 9,10-diethoxyanthracene, 9,10-dipropoxyanthracene, 9,10-bis(2-ethylhexyloxy) anthracene, and other anthracene-based sensitizers, as well as 2,4-diethyl thioxanthone, 2-isopropyl thioxanthone, 4-isopropyl thioxanthone, and other thioxanthone-based sensitizers. Representative examples of commercial products include DBA and DEA (manufactured by Kawasaki Kasei Chemicals Ltd.) for anthracene-based sensitizers, and DETX and ITX (manufactured by Lambson Ltd.) for thioxanthone-based sensitizers, and the like.

Preferably the content of sensitizer is in a range of 0 to 8.0% by mass relative to the total mass of photopolymerizable components. A content exceeding 8.0% by mass is not desirable because it represents an excessive addition that no longer leads to improvement in effects.

It should be noted that, if a thioxanthone-based sensitizer is used as the sensitizer, the photocurable inkjet printing ink composition tends to turn yellow and take on a hue that is yellower than the color based on the pigment, etc. (inherent hue), and therefore preferably the content of such thioxanthone-based sensitizer is determined as deemed appropriate for each color.

To be specific, preferably white ink compositions and clear ink compositions that are more easily affected by a change in color tone do not contain any thioxanthone compound as the sensitizer. Also, preferably magenta ink compositions and cyan ink compositions that present problems if a change in hue occurs use a thioxanthone compound only to the extent that doing so does not cause problems with the hue. Also, preferably black ink compositions and yellow ink compositions use a thioxanthone-based compound as the sensitizer because their hue is not affected by a color change and their photopolymerizability is lower compared to ink compositions of other hues.

(Other Components)

Furthermore, in the photocurable inkjet printing ink composition proposed by the present invention, various additives such as surfactants, plasticizers, polymerization inhibitors, surface conditioners, ultraviolet protective agents, photostabilizers, and antioxidants may be used as necessary.

(Viscosity of Photocurable Inkjet Printing Ink Composition)

The photocurable inkjet printing ink composition proposed by the present invention has a viscosity at 25° C. of preferably 30.0 mPa·s or lower, or more preferably 20.0 mPa·s or lower, or yet more preferably 10.0 mPa·s or lower, or most preferably 8.0 mPa·s or lower. If the viscosity exceeds 30.0 mPa·s, discharge of the ink composition from inkjet printing nozzles may become difficult.

It should be noted that this viscosity represents viscosity measured under the conditions of 25° C. and 20 rpm using a type-E viscometer (product name: RE100L Viscometer, manufactured by Toki Sangyo Co., Ltd.).

(Manufacturing of Photocurable Inkjet Printing Ink Composition)

Next, how the photocurable inkjet printing ink composition proposed by the present invention is manufactured using these materials is explained.

The photocurable inkjet printing ink composition proposed by the present invention can be obtained by, for example, dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus Py, DeBEE 2000, etc.), pearl mill, or other dispersion machine, and adjusting the viscosity of the photocurable inkjet printing ink composition to between 2 and 10 mPa·s.

Preferably the content of all organic solvents in the photocurable inkjet printing ink composition proposed by the present invention, which is the total amount of ink composition less the total sum of the amounts of solid components as well as other additives used as necessary, is changed as deemed appropriate so as to bring the ink viscosity into the aforementioned range.

The thus obtained photocurable inkjet printing ink composition proposed by the present invention can be used with inkjet printers on base materials whose top-face layer at least is constituted by a paper or resin such as vinyl chloride-based polymer and ethylene-vinyl acetate-based copolymer.

(Applications)

The photocurable inkjet printing ink composition proposed by the present invention can be used in known applications using paper base materials, among which it is particularly suited for situations where abrasion resistance is required, and the ink composition is used on top-face layers of nonabsorbent base materials. Nonabsorbent materials are not limited to metals, resins, ceramics, etc., but are preferably the ink composition is used on top face-layers of resin base materials, or more strictly on top-face layers where this resin is constituted by a vinyl chloride-based polymer or ethylene-vinyl acetate-based copolymer or by vinyl chloride resin, polyethylene terephthalate, polycarbonate, etc., from the viewpoint of water resistance, etc. Also, from the viewpoint of adhesion, etc., preferably it is used on top-face layers where the resin is constituted by polyethylene terephthalate (PET), vinyl chloride resin, polycarbonate, tarpaulin, acrylic-based resin, etc.

The method for printing and curing the photocurable inkjet printing ink composition proposed by the present invention may specifically be a method whereby the photocurable inkjet printing ink composition proposed by the present invention is discharged onto a base material from an inkjet head, after which the coating film of the ink composition proposed by the present invention that has landed on the base material is exposed to light and thereby cured.

For example, discharge onto the base material (printing of images) may be implemented by supplying the photocurable inkjet printing ink composition proposed by the present invention to a low-viscosity-compatible printer head of an inkjet recording printer, and then discharging the ink composition from the printer head in such a way that the coating film on the base material will have a film thickness of 1 to 60 μm, for example. Also, exposure to light and curing (curing of images) may be implemented by irradiating light onto the coating film of the photocurable inkjet printing ink composition proposed by the present invention that has been applied on the base material as images.

For the inkjet recording printer device with which to print the photocurable inkjet printing ink composition proposed by the present invention, any traditionally-used inkjet recording printer device may be utilized. It should be noted that, if a continuous-type inkjet recording printer device is used, a conductivity-imparting agent is further added to the photocurable inkjet printing ink composition proposed by the present invention to adjust its conductivity.

The light source in the aforementioned curing of the coating film may be UV light (UV lamp), UV light (light-emitting diode (LED)), electron beam, visible light, etc., where a light-emitting diode (LED) that generates UV light with an emission peak wavelength in a range of 350 to 420 nm is preferred from an environmental aspect.

UV light from a light-emitting diode (LED) light source refers to "light irradiated from a light-emitting diode that generates UV light with an emission peak wavelength in a range of 350 to 420 nm."

EXAMPLES

The present invention is explained in greater detail below by citing examples, but the present invention is not limited to these examples. It should be noted that, unless otherwise specified, "%" and "part" refer to "% by mass" and "part by mass," respectively.

The materials used in the following Examples and Comparative Examples are listed below. In the Tables, the unit of values in the fields relating to pigments, dispersants, resins, solvents, and totals is "% by mass."

Also, in the Tables, "photopolymerizable compound A" represents a compound that is blended in according to requirement A under the present invention, and similarly "photopolymerizable compound B" represents a compound that is blended in according to requirement B under the present invention.
(Amine-Modified Oligomer)
  CN371 (manufactured by Sartomer, Inc.)
(Photopolymerizable Compound A)
  VMOX: Vinyl methyl oxazolidinone
(Photopolymerization Initiators)
  TPOL: Ethoxy (2,4,6-trimethylbenzoyl)phenylphosphine oxide
  Omnirad 819: Bis(2,4,6-trimethylbenzoyl)phenylphosphine oxide
  TPO: 2,4,6-trimethylbenzoyl-diphenyl-phosphine oxide (manufactured by Lambson Ltd.)
(Sensitizer)
  DETX: Diethyl thioxanthone (manufactured by Lambson Ltd.)
(Polymerization Inhibitor)
  UV-5: Dioctyl maleate (manufactured by Kromachem Ltd.)
(Surface Conditioner)
  BYK-315N: Polyester-modified polymethylalkylsiloxane surfactant of 25% by mass in solids content, whose solvent component is a mixture of methoxypropyl acetate and phenoxyethanol at a 1/1 ratio by mass (manufactured by BYK-Chemie Japan K.K.)
(Colorants (Pigments))
  PB15:4 Pigment Blue 15:4
  PR122 Pigment Red 122
  PY155 Pigment Yellow 155
  PBk7 Carbon black
  PO71 Pigment Orange 71
  PG7 Pigment Green 7
  PV23 Pigment Violet 23
  PR254 Pigment Red 254
(Pigment Dispersants)
  SOLSPERSE 32000 (polyamine-based pigment dispersant, manufactured by The Lubrizol Corporation)
  BYKJET 9150 (pigment dispersant having a maleimide structure, 70% by mass in solids content, manufactured by BYK-Chemie Japan K.K.)

Examples 1 to 11 and Comparative Examples 1 to 10

<Manufacturing of Photocurable Inkjet Printing Ink Compositions)

The materials were mixed under agitation according to the recipes in Table 1 (blending ratios of the materials are expressed in % by mass), to obtain the photocurable inkjet printing ink compositions in the Examples and Comparative Examples.
<Evaluation Methods and Evaluation Criteria>

The base materials for evaluation shown in Table 1 are listed below:
  PET: LUMIRROR, manufactured by Toray Industries, Inc.
  PC: IUPILON Sheet FE2000, manufactured by Mitsubishi Gas Chemical Company Inc.
  PVC: PVC80, manufactured by LINTEC Corporation
(Viscosity of Ink Composition)

The photocurable inkjet printing ink compositions obtained in Examples and Comparative Examples were measured for viscosity using a type-E viscometer (product name: RE100L Viscometer, manufactured by Toki Sangyo Co., Ltd.) under the conditions of 25° C. in temperature and 20 rpm in rotating speed.
(Photopolymerization Initiator Solubility)

In the compositional makeup of each Example or Comparative Example, the components other than pigment and pigment dispersant were mixed under agitation using a dispersion device at room temperature, and the time required for the photopolymerization initiator(s) to dissolve was measured and evaluated according to the evaluation criteria below:
  ○: Dissolved within 1 hour.
  Δ: Dissolved within 1 to 2 hours.
  x: Did not dissolve after 2 hours.
(Surface Curability)

The photocurable inkjet printing ink composition obtained in each Example or Comparative Example was applied on the surface of a PET film using Bar Coater No. 4, to obtain each coated film. Next, using a conveyor-type irradiation device (Heraeus's STM-250E-16, lamp: Z-8 lamp (metal halide type)), the coated film was passed through the device under the irradiation conditions of 120 W×50 m/min and 75 mJ/cm$^2$ in cumulative UV light quantity [cumulative UV light quantity was obtained by measuring the irradiated quantity with the measurement ranges of 250 to 260 nm, 280 to 320 nm, 320 to 390 nm, and 395 to 445 nm, using EIT's UVIMAP (UM 365H-S) as a measuring instrument], and the surface curability was evaluated by the number of times it had to be passed through the device (number of passes) until there was no more surface tack.
(Tackiness)

The photocurable inkjet printing ink composition obtained in each Example or Comparative Example was applied on the surface of each of two PET films using Bar Coater No. 4 and then irradiated with UV light, to obtain cured coating films.

The obtained two PET films were layered with the cured coating films on their surfaces contacting each other, and then separated by hand after 30 seconds, to evaluate the degree of resistance according to the evaluation criteria below:
  ○: No resistance is felt.
  Δ: Resistance is felt but the coating films are not stripped off.
  x: The coating films are stripped off.
(Adhesion)

The photocurable inkjet printing ink composition obtained in each Example or Comparative Example was applied on various types of base materials (PET, PC, PVC) using Bar Coater No. 4 and then irradiated with UV light, to obtain cured coating films.

The obtained coating films were evaluated for CELLO-TAPE (registered trademark) adhesion according to the evaluation criteria below:
  ○: The coating film are not stripped off.
  x: The coating film are stripped off.

(Abrasion Resistance)

The photocurable inkjet printing ink composition obtained in each Example or Comparative Example was applied on the surface of a PVC film using Bar Coater No. 6 and then irradiated with UV light, to obtain a cured coating film.

The obtained coating film was put through a Gakushin color fastness tester to rub the colored coating film 100 times with a bleached white cloth under a load of 500 g at a speed of 60 rpm, to evaluate the degree of separation of the coating film, as well as the degree of color transfer to the bleached white cloth, according to the evaluation criteria below:
  ○: Color transfer did not occur, or color transfer covering less than 5% of the area of the cloth occurred.
  Δ: Color transfer covering 5% or more but less than 70% of the area of the cloth occurred.
  x: Color transfer covering 70% or more of the area of the cloth occurred.

(Water Resistance)

The photocurable inkjet printing ink composition obtained in each Example or Comparative Example was applied on the surface of a PVC film using Bar Coater No. 6 and then irradiated with UV light, to obtain a cured coating film.

The obtained coating film was put through a Gakushin color fastness tester to rub the colored coating film 100 times with a bleached white cloth moistened with five drops of water under a load of 500 g at a speed of 30 rpm, to evaluate the degree of separation of the coating film, as well as the degree of color transfer to the bleached white cloth, according to the evaluation criteria below:
  ○: Color transfer did not occur, or color transfer covering less than 5% of the area of the cloth occurred.
  Δ: Color transfer covering 5% or more but less than 70% of the area of the cloth occurred.
  x: Color transfer covering 70% or more of the area of the cloth occurred.

(Ethanol Resistance)

The photocurable inkjet printing ink composition obtained in each Example or Comparative Example was applied on the surface of a PVC film using Bar Coater No. 6 and then irradiated with UV light, to obtain a cured coating film.

The obtained coating film was put through a Gakushin color fastness tester to rub the colored coating film 10 times with a bleached white cloth moistened with five drops of 70% aqueous ethanol solution under a load of 200 g at a speed of 30 rpm, to evaluate the degree of separation of the coating film, as well as the degree of color transfer to the bleached white cloth, according to the evaluation criteria below:
  ○: Color transfer did not occur, or color transfer covering less than 30% of the area of the cloth occurred.
  Δ: Color transfer covering 30% or more but less than 70% of the area of the cloth occurred.
  x: Color transfer covering 70% or more of the area of the cloth occurred.

(Banding Resistance)

Each coating film that has been printed on a PVC film with a commercially-available inkjet printer was measured for glossiness at a measurement angle of 60° using a variable-angle gloss meter (product name: GlossMeter VG7000, manufactured by Nippon Denshoku Industries Co., Ltd.), and the result was evaluated according to the evaluation criteria below:
  ○: The measured value is 15.0 or higher.
  Δ: The measured value is 10.0 or higher but lower than 15.0.
  x: The measured value is lower than 10.0.

TABLE 1-1

|  |  | Examples | | | | | | |
| --- | --- | --- | --- | --- | --- | --- | --- | --- |
|  |  | 1 | 2 | 3 | 4 | 5 | 6 | 7 |
| Amine-modified oligomer | CN371 | 5.0 | 5.0 | 5.0 | 5.0 | 2.0 | 2.0 | 5.0 |
| Photopolymerizable compounds A | VMOX |  |  | 15.0 | 5.3 |  |  |  |
|  | N,N-dimethylacrylamide | 7.5 |  |  | 10.0 | 7.5 | 7.5 | 7.5 |
|  | Benzyl acrylate | 28.6 | 21.1 | 21.1 | 20.8 | 30.4 | 30.4 | 28.6 |
|  | Vinylcaprolactam |  | 15.0 |  |  |  |  |  |
| Photopolymerizable compounds B | Hexanediol diacrylate | 20.0 | 20.0 | 10.0 | 20.0 | 20.0 | 20.0 | 20.0 |
|  | Isobornyl acrylate |  |  | 10.0 |  |  |  |  |
| Other photopolymerizable compounds | Acryloylmorpholine | 10.0 | 10.0 | 10.0 | 10.0 | 10.0 | 7.5 | 7.5 |
|  | Ethyl carbitol acrylate | 7.5 | 7.5 | 7.5 | 7.5 | 7.5 | 7.5 | 7.5 |
|  | Phenoxyethyl acrylate | 7.5 | 7.5 | 7.5 | 7.5 | 7.5 | 7.5 | 7.5 |
| Photopolymerization initiators | TPOL | 3.0 | 3.0 | 3.0 | 3.0 | 3.0 | 3.0 | 3.0 |
|  | Irgacure 819 | 5.5 | 5.5 | 5.5 | 5.5 | 5.5 | 5.5 | 5.5 |
|  | TPO |  |  |  |  |  |  |  |
| Sensitizer | DETX | 0.5 | 0.5 | 0.5 | 0.5 | 0.5 | 3.0 | 3.0 |
| Polymerization inhibitor | UV-5 | 2.0 | 2.0 | 2.0 | 2.0 | 2.0 | 2.0 | 2.0 |
| Surface conditioner | BYK-315N | 0.5 | 0.5 | 0.5 | 0.5 | 0.5 | 0.5 | 0.5 |
| Pigments | PB15:4 | 1.6 | 1.6 | 1.6 | 1.6 |  |  |  |
|  | PR122 |  |  |  |  | 2.4 |  |  |
|  | PY155 |  |  |  |  |  | 2.4 |  |
|  | PBk7 |  |  |  |  |  |  | 1.6 |
|  | PO71 |  |  |  |  |  |  |  |
|  | PG7 |  |  |  |  |  |  |  |
|  | PV23 |  |  |  |  |  |  |  |
|  | PR254 |  |  |  |  |  |  |  |

TABLE 1-1-continued

|  |  | Examples | | | | | | |
| --- | --- | --- | --- | --- | --- | --- | --- | --- |
|  |  | 1 | 2 | 3 | 4 | 5 | 6 | 7 |
| Pigment dispersants | SOLSPERSE 32000 | 0.8 | 0.8 | 0.8 | 0.8 | 1.2 | 1.2 | 0.8 |
|  | BYKJET9150 |  |  |  |  |  |  |  |
| Total |  | 100.0 | 100.0 | 100.0 | 100.0 | 100.0 | 100.0 | 100.0 |
| Total amount of photopolymerizable compounds A |  | 36.10 | 36.10 | 36.10 | 36.10 | 37.90 | 37.90 | 36.10 |
| Total amount of photopolymerizable compounds B |  | 20.00 | 20.00 | 20.00 | 20.00 | 20.00 | 20.00 | 20.00 |
| TPOL/Irgacure 819 |  | 0.55 | 0.55 | 0.55 | 0.55 | 0.55 | 0.55 | 0.55 |
| TPOL + Irgacure 819 |  | 8.50 | 8.50 | 8.50 | 8.50 | 8.50 | 8.50 | 8.50 |
| Viscosity (mPa · s) |  | 7.4 | 7.8 | 7.3 | 7.5 | 7.5 | 7.5 | 7.5 |
| Initiator solubility |  | ○ | ○ | ○ | ○ | ○ | ○ | ○ |
| Surface curability |  | 2 | 2 | 2 | 2 | 2 | 2 | 2 |
| Tackiness |  | ○ | ○ | ○ | ○ | ○ | ○ | ○ |
| Adhesion (PET) |  | ○ | ○ | ○ | ○ | ○ | ○ | ○ |
| Adhesion (PC) |  | ○ | ○ | ○ | ○ | ○ | ○ | ○ |
| Adhesion (PVC) |  | ○ | ○ | ○ | ○ | ○ | ○ | ○ |
| Abrasion resistance |  | ○ | ○ | ○ | ○ | ○ | ○ | ○ |
| Water resistance |  | ○ | ○ | ○ | ○ | ○ | ○ | ○ |
| Ethanol resistance |  | ○ | ○ | ○ | ○ | ○ | ○ | ○ |
| Banding resistance |  | ○ | ○ | ○ | ○ | ○ | ○ | ○ |

TABLE 1-2

|  |  | Examples | | | | Comparative Examples | | |
| --- | --- | --- | --- | --- | --- | --- | --- | --- |
|  |  | 8 | 9 | 10 | 11 | 1 | 2 | 3 |
| Amine-modified oligomer | CN371 | 2.0 | 2.0 | 5.0 | 2.0 | 5.0 | 5.0 | 5.0 |
| Photopolymerizable compounds A | VMOX |  |  |  |  | 5.0 | 12.8 | 15.0 |
|  | N,N-dimethylacrylamide |  |  |  |  |  |  |  |
|  | Benzyl acrylate | 30.1 | 30.1 | 28.4 | 30.1 | 11.1 | 25.8 | 19.6 |
|  | Vinylcaprolactam | 7.5 | 7.5 | 7.5 | 7.5 |  |  |  |
| Photopolymerizable compounds B | Hexanediol diacrylate | 20.0 | 20.0 | 20.0 | 20.0 | 42.0 | 12.5 | 25.0 |
|  | Isobornyl acrylate |  |  |  |  |  |  |  |
| Other photopolymerizable compounds | Acryloylmorpholine | 7.5 | 10.0 | 10.0 | 7.5 | 8.0 | 10.0 | 8.0 |
|  | Ethyl carbitol acrylate | 7.5 | 7.5 | 7.5 | 7.5 | 7.5 | 12.5 | 7.5 |
|  | Phenoxyethyl acrylate | 7.5 | 7.5 | 7.5 | 7.5 | 7.5 | 7.5 | 7.5 |
| Photopolymerization initiators | TPOL | 3.0 | 3.0 | 3.0 | 3.0 | 3.0 | 3.0 |  |
|  | Irgacure 819 | 5.5 | 5.5 | 5.5 | 5.5 | 5.5 | 5.5 |  |
|  | TPO |  |  |  |  |  |  | 7.0 |
| Sensitizer | DETX | 3.0 | 0.5 | 0.5 | 3.0 | 0.5 | 0.5 | 0.5 |
| Polymerization inhibitor | UV-5 | 2.0 | 2.0 | 2.0 | 2.0 | 2.0 | 2.0 | 2.0 |
| Surface conditioner | BYK-315N | 0.5 | 0.5 | 0.5 | 0.5 | 0.5 | 0.5 | 0.5 |
| Pigments | PB15:4 |  |  |  |  | 1.6 | 1.6 | 1.6 |
|  | PR122 |  |  |  |  |  |  |  |
|  | PY155 |  |  |  |  |  |  |  |
|  | PBk7 |  |  |  |  |  |  |  |
|  | PO71 | 2.4 |  |  |  |  |  |  |
|  | PG7 |  | 2.4 |  |  |  |  |  |
|  | PV23 |  |  | 1.6 |  |  |  |  |
|  | PR254 |  |  |  | 2.4 |  |  |  |
| Pigment dispersants | SOLSPERSE 32000 | 0.6 | 0.6 | 0.4 | 0.6 | 0.8 | 0.8 | 0.8 |
|  | BYKJET9150 | 0.9 | 0.9 | 0.6 | 0.9 |  |  |  |
| Total |  | 100.0 | 100.0 | 100.0 | 100.0 | 100.0 | 100.0 | 100.0 |
| Total amount of photopolymerizable compounds A |  | 37.60 | 37.60 | 35.94 | 37.60 | 16.10 | 38.60 | 34.60 |
| Total amount of photopolymerizable compounds B |  | 20.00 | 20.00 | 20.00 | 20.00 | 42.00 | 12.50 | 25.00 |
| TPOL/Irgacure 819 |  | 0.55 | 0.55 | 0.55 | 0.55 | 0.55 | 0.55 | — |
| TPOL + Irgacure 819 |  | 8.50 | 8.50 | 8.50 | 8.50 | 8.50 | 8.50 | 0.00 |
| Viscosity (mPa · s) |  | 8.0 | 8.0 | 7.5 | 8.0 | — | 6.3 | 6.8 |
| Initiator solubility |  | ○ | ○ | ○ | ○ | X | ○ | ○ |
| Surface curability |  | 2 | 2 | 2 | 2 | — | 2 | 3 |
| Tackiness |  | ○ | ○ | ○ | ○ | — | △ | △ |
| Adhesion (PET) |  | ○ | ○ | ○ | ○ | — | ○ | ○ |
| Adhesion (PC) |  | ○ | ○ | ○ | ○ | — | ○ | ○ |
| Adhesion (PVC) |  | ○ | ○ | ○ | ○ | — | ○ | ○ |
| Abrasion resistance |  | ○ | ○ | ○ | ○ | — | X | ○ |
| Water resistance |  | ○ | ○ | ○ | ○ | — | X | ○ |
| Ethanol resistance |  | ○ | ○ | ○ | ○ | — | X | ○ |
| Banding resistance |  | ○ | ○ | ○ | ○ | — | X | X |

TABLE 1-3

|  |  | Comparative Examples | | | | | | |
| --- | --- | --- | --- | --- | --- | --- | --- | --- |
|  |  | 4 | 5 | 6 | 7 | 8 | 9 | 10 |
| Amine-modified oligomer | CN371 | 5.0 | 5.0 | 5.0 | 5.0 | 5.0 | 5.0 |  |
| Photopolymerizable compounds A | VMOX |  |  |  |  |  |  |  |
|  | N,N-dimethylacrylamide | 15.0 | 15.0 | 15.0 | 14.8 | 11.3 | 15.0 | 15.0 |
|  | Benzyl acrylate | 19.6 | 18.6 | 23.1 | 20.8 | 20.8 | 21.6 | 21.1 |
|  | Vinylcaprolactam |  |  |  |  |  |  |  |
| Photopolymerizable compounds B | Hexanediol diacrylate | 21.0 | 20.0 | 20.0 | 20.0 | 20.0 | 20.0 | 25.0 |
|  | Isobornyl acrylate |  |  |  |  |  |  |  |
| Other photopolymerizable compounds | Acryloylmorpholine | 10.0 | 10.0 | 10.0 | 10.0 | 10.0 | 14.0 | 10.0 |
|  | Ethyl carbitol acrylate | 7.5 | 7.5 | 7.5 | 7.5 | 7.5 | 7.5 | 7.5 |
|  | Phenoxyethyl acrylate | 7.5 | 7.5 | 7.5 | 7.5 | 7.5 | 7.5 | 7.5 |
| Photopolymerization initiators | TPOL |  | 7.0 | 1.0 | 7.0 | 5.0 | 1.0 | 3.0 |
|  | Irgacure 819 | 4.5 | 4.0 | 5.5 | 2.0 | 7.5 | 3.0 | 5.5 |
|  | TPO | 4.5 |  |  |  |  |  |  |
| Sensitizer | DETX | 0.5 | 0.5 | 0.5 | 0.5 | 0.5 | 0.5 | 0.5 |
| Polymerization inhibitor | UV-5 | 2.0 | 2.0 | 2.0 | 2.0 | 2.0 | 2.0 | 2.0 |
| Surface conditioner | BYK-315N | 0.5 | 0.5 | 0.5 | 0.5 | 0.5 | 0.5 | 0.5 |
| Pigments | PB15:4 | 1.6 | 1.6 | 1.6 | 1.6 | 1.6 | 1.6 | 1.6 |
|  | PR122 |  |  |  |  |  |  |  |
|  | PY155 |  |  |  |  |  |  |  |
|  | PBk7 |  |  |  |  |  |  |  |
|  | PO71 |  |  |  |  |  |  |  |
|  | PG7 |  |  |  |  |  |  |  |
|  | PV23 |  |  |  |  |  |  |  |
|  | PR254 |  |  |  |  |  |  |  |
| Pigment dispersants | SOLSPERSE 32000 | 0.8 | 0.8 | 0.8 | 0.8 | 0.8 | 0.8 | 0.8 |
|  | BYKJET9150 |  |  |  |  |  |  |  |
| Total |  | 100.0 | 100.0 | 100.0 | 100.0 | 100.0 | 100.0 | 100.0 |
| Total amount of photopolymerizable compounds A |  | 34.60 | 33.60 | 38.10 | 35.60 | 32.10 | 36.60 | 36.10 |
| Total amount of photopolymerizable compounds B |  | 21.00 | 20.00 | 20.00 | 20.00 | 20.00 | 20.00 | 25.00 |
| TPOL/Irgacure 819 |  | 0.00 | 1.75 | 0.18 | 3.50 | 0.67 | 0.33 | 0.55 |
| TPOL + Irgacure 819 |  | 4.50 | 11.00 | 6.50 | 9.00 | 12.50 | 4.00 | 8.50 |
| Viscosity (mPa · s) |  | 7.7 | 9.0 | 7.0 | 6.7 | 9.0 | 6.3 | 5.5 |
| Initiator solubility |  | ○ | ○ | ○ | ○ | Δ | ○ | ○ |
| Surface curability |  | 2 | 1 | 6 | 4 | 1 | 6 | 6 |
| Tackiness |  | ○ | Δ | Δ | Δ | ○ | Δ | Δ |
| Adhesion (PET) |  | ○ | ○ | ○ | ○ | ○ | ○ | ○ |
| Adhesion (PC) |  | ○ | ○ | Δ | ○ | ○ | Δ | ○ |
| Adhesion (PVC) |  | ○ | ○ | ○ | ○ | ○ | ○ | ○ |
| Abrasion resistance |  | ○ | X | Δ | X | ○ | X | Δ |
| Water resistance |  | ○ | ○ | Δ | Δ | ○ | Δ | ○ |
| Ethanol resistance |  | ○ | ○ | ○ | ○ | ○ | ○ | ○ |
| Banding resistance |  | X | Δ | ○ | Δ | X | X | ○ |

Examples 1 to 11 conforming to the present invention, containing coloring pigments while also having appropriate viscosities, achieved excellent effects in terms of polymerization initiator solubility, surface curability, tackiness, adhesion to various types of base materials, abrasion resistance, water resistance, ethanol resistance, and banding resistance.

By contrast, Comparative Example 1 not satisfying requirement A (low total amount of photopolymerizable compounds A) was unable to dissolve the polymerization initiators, while Comparative Example 2 not satisfying requirement B (low total amount of photopolymerizable compounds B) had poor tackiness, abrasion resistance, water resistance, ethanol resistance, and banding resistance.

Comparative Example 3 adopting TPO as a photopolymerization initiator displayed slightly poor surface curability along with poor tackiness and banding resistance. Comparative Example 4 combining TPO and Omnirad 819 also resulted in poor banding resistance.

According to Comparative Example 5 where the ratio of ethoxy (2,4,6-trimethylbenzoyl)phenylphosphine oxide/bis (2,4,6-trimethylbenzoyl)phenylphosphine oxide under requirement D was too high, the viscosity of the photocurable inkjet printing ink composition was too high and its tackiness, abrasion resistance, and banding resistance were also poor; on the other hand, Comparative Example 6 where this ratio was too low showed poor surface curability, tackiness, adhesion, abrasion resistance, and water resistance.

Comparative Example 7, where requirement C was not satisfied (low content of bis(2,4,6-trimethylbenzoyl)phenylphosphine oxide) and the ratio of ethoxy (2,4,6-trimethylbenzoyl)phenylphosphine oxide/bis(2,4,6-trimethylbenzoyl)phenylphosphine oxide under requirement D was even higher than Comparative Example 5, resulted in poor surface curability, tackiness, abrasion resistance, water resistance, and banding resistance.

According to Comparative Example 8 where the total content of ethoxy (2,4,6-trimethylbenzoyl)phenylphosphine oxide and bis(2,4,6-trimethylbenzoyl)phenylphosphine oxide under requirement D was excessive, the viscosity of the photocurable inkjet printing ink composition was high, and its polymerization initiator solubility and banding resistance were poor. On the other hand, Comparative Example 9 associated with too low a total content of these materials was poor in surface curability, tackiness, adhesion to polycarbonate base material, abrasion resistance, water resistance, and banding resistance.

Comparative Example 10 not containing the amine-modified oligomer under requirement E had poor surface curability, tackiness, and abrasion resistance.

What is claimed:

1. A photocurable inkjet printing ink composition satisfying all of requirements A to G below:
   A: a total content of one or more compounds selected from the group consisting of vinyl methyl oxazolidinone, N,N-dimethylacrylamide, benzyl acrylate, and N-vinylcaprolactam is 30.0% by mass or higher in the photocurable inkjet printing ink composition;
   B: a total content of one or more compounds selected from the group consisting of saturated hydrocarbon group-containing monofunctional monomers with 6 or more carbon atoms and saturated hydrocarbon group-containing polyfunctional monomers with 6 or more carbon atoms is 15.0% by mass or higher in the photocurable inkjet printing ink composition;
   C: a content of bis(2,4,6-trimethylbenzoyl)phenylphosphine oxide is 3.5% by mass or higher in the photocurable inkjet printing ink composition;
   D: a total content of ethoxy (2,4,6-trimethylbenzoyl) phenylphosphine oxide and bis(2,4,6-trimethylbenzoyl)phenylphosphine oxide is 6.0 to 12.0% by mass in the photocurable inkjet printing ink composition, and their ratio by mass, or ethoxy (2,4,6-trimethylbenzoyl) phenylphosphine oxide/bis(2,4,6-trimethylbenzoyl) phenylphosphine oxide, is 0.3 to 1.5;
   E: a content of amine-modified oligomer is 0.5 to 15.0% by mass in the photocurable inkjet printing ink composition;
   F: a colorant constituted by a pigment is included; and
   G: a total content of one or more pigment dispersants having tertiary amino groups or a maleimide structure is 5 to 80% by mass relative to the pigment, wherein the one or more pigment dispersants is a pigment dispersant having a maleimide structure or a combination of a pigment dispersant having tertiary amino groups and a pigment dispersant having a maleimide structure.

2. The photocurable inkjet printing ink composition according to claim 1, wherein, as the compound(s) specified in requirement A, benzyl acrylate is contained by 16.0% by mass or more.

3. The photocurable inkjet printing ink composition according to claim 1, wherein, in requirement G, the one or more pigment dispersants is a combination of a pigment dispersant having tertiary amino groups and a pigment dispersant having a maleimide structure.

* * * * *